United States Patent [19]

Dobberpuhl et al.

[11] Patent Number: 4,671,395

[45] Date of Patent: Jun. 9, 1987

[54] POWER TAKE-OFF BRAKE AND CLUTCH ACTUATION ASSEMBLY

[75] Inventors: Dale R. Dobberpuhl; Robert N. Behrens, both of Horicon, Wis.

[73] Assignee: Deere & Company, Moline, Ill.

[21] Appl. No.: 872,781

[22] Filed: Jun. 9, 1986

Related U.S. Application Data

[63] Continuation of Ser. No. 584,192, Feb. 27, 1984, abandoned.

[51] Int. Cl.⁴ .................... F16D 67/06; B60K 41/24
[52] U.S. Cl. ..................................... 192/17 C; 192/9
[58] Field of Search ............. 192/17 C, 17 A, 17 R, 192/9, 10, 19, 13 R; 188/156, 164, 170

[56] References Cited

U.S. PATENT DOCUMENTS

| | | | |
|---|---|---|---|
| 1,631,067 | 5/1927 | Seville | 192/10 |
| 1,633,644 | 6/1927 | McGuiness | 192/17 R |
| 1,930,075 | 10/1933 | Bentley et al. | 192/17 R |
| 2,091,449 | 8/1937 | Littell et al. | 192/17 R |
| 2,675,103 | 4/1954 | Weber | 192/17 C |
| 3,529,701 | 9/1970 | Gethmann et al. | 188/170 |

Primary Examiner—George H. Krizmanich

[57] ABSTRACT

A control lever communicates with a plurality of additional levers and an electrical circuit. A PTO brake and electric clutch are responsive to the control lever and circuit for engagement and disengagement. The linkage system includes an electrically responsive inductor and magnetically responsive plate. When the PTO brake is disengaged and the clutch is engaged, the electrical circuit supplies current to the inductor which creates a magnetic field to capture the plate holding the brake and clutch in their respective modes. Upon actuation of the control lever or full application of an associated vehicle's wheel brakes, the circuit is disrupted to the inductor allowing a spring to act upon the linkage assembly to engage the PTO brake and causing the PTO clutch to be disengaged.

9 Claims, 4 Drawing Figures

POWER TAKE-OFF BRAKE AND CLUTCH ACTUATION ASSEMBLY

CROSS-REFERENCE TO RELATED APPLICATION

This application is a continuation of U.S. application Ser. No. 584,192 filed on 27 Feb. 1984, now abandoned.

BACKGROUND OF THE INVENTION

This invention relates to tractor power take-off assemblies and, more particularly, to power take-off brake and clutch actuation assemblies.

It is known to provide a tractor mounted power take-off (PTO) assembly with a brake assembly cooperatively acting through an actuation assembly with a PTO clutch assembly. Collectively, one of the main purposes of such assemblies is to reduce the stopping time associated with disengagement of the PTO assembly as evidenced by U.S. Pat. No. 3,831,722. Such assemblies have achieved a modicum of success in reducing PTO stopping time as compared to PTO assemblies not so equipped with a PTO brake. However, it is desirable to further decrease the PTO stopping time. It is additionally desirable to enable the actuation assembly to be responsive to an operator encountered panic situation.

SUMMARY OF THE INVENTION

It is an objective of the present invention to present a PTO brake and clutch actuation assembly which exhibits substantially shortened stopping time.

It is a further objective of the present invention to present a PTO actuation system which can automatically respond to a vehicle operator's reaction to the presentation of a panic situation.

The PTO actuation system includes a control lever communicating with a linkage assembly and an electric circuit responsible to engaging and disengaging the brake-clutch assembly. The control lever acts upon the linkage assembly such that displacement of said control lever causes a magnetically responsive plate to be positionable in either a first or second position. When the plate is in a second position, the plate is within the magnetic field of influence of an electrically responsive inductor. The linkage assembly is also in communication with a spring biased brake applied linkage arrangement. The magnetic influence on the plate is sufficient to overcome the spring biasing force to cause the linkage to assume and maintain a brake disengage position.

When the plate is in the second position, a band brake is disengaged, bringing the linkage arrangement into contact with a first and second switch placing the switches in an "ON" condition. When the switches are in an "ON" condition, electrical current is supplied through a circuit to an inductor and a PTO electric clutch, placing the inductor and the clutch in an "ON" condition representing a PTO engaged condition. Should a vehicle operator instigate a full vehicle brake applied condition, current is disrupted to the inductor by the circuit allowing the linkage spring to bias the PTO brake "ON" and placing the switches in an "OFF" condition. As a result, the PTO clutch is turned "OFF".

DESCRIPTION OF THE PREFERRED EMBODIMENT

Figure 1:
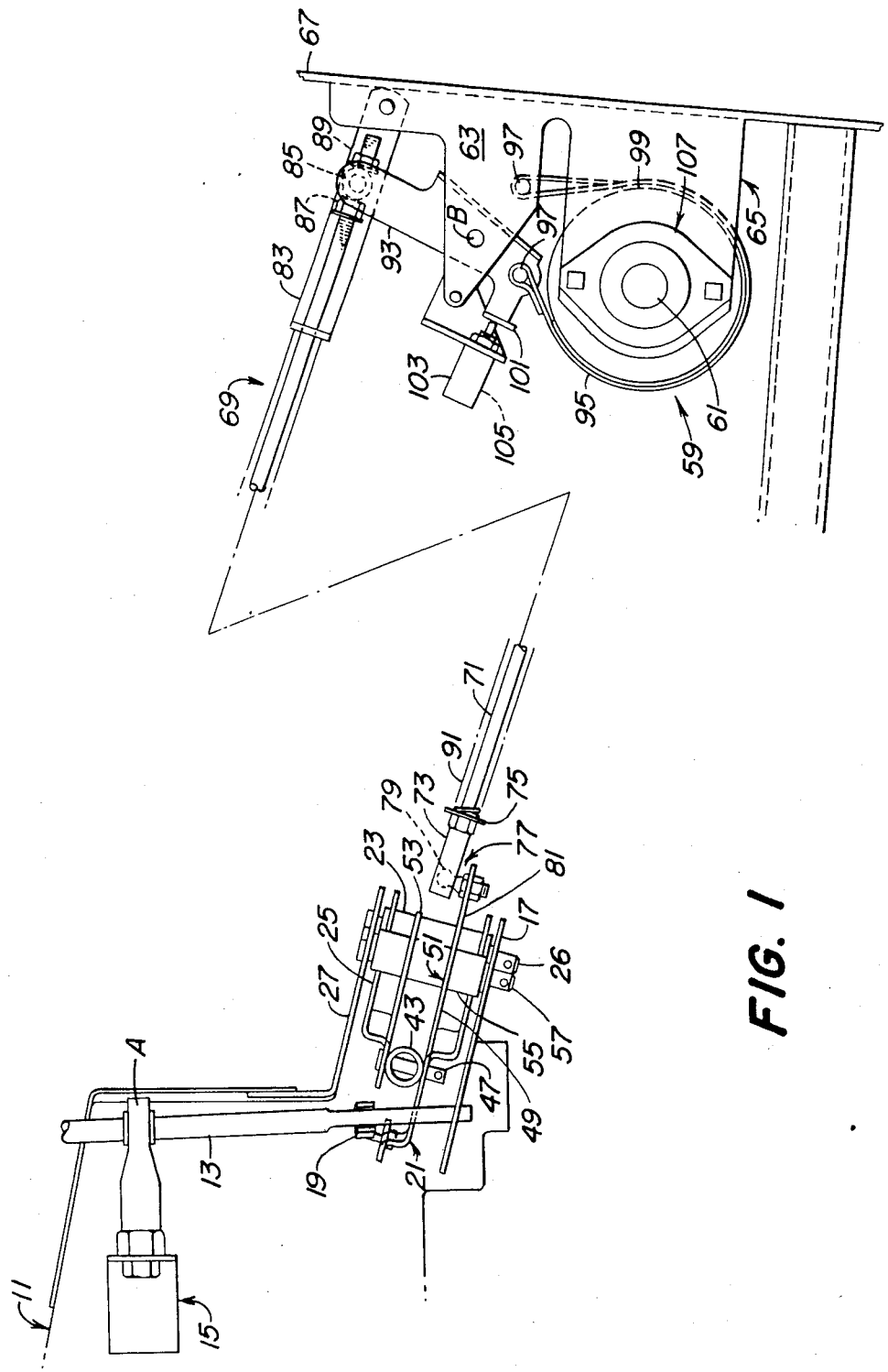
FIG. 1 is a sectioned side elevated view of a PTO clutch and brake actuation assembly in accordance with the present invention.
Figure 2:
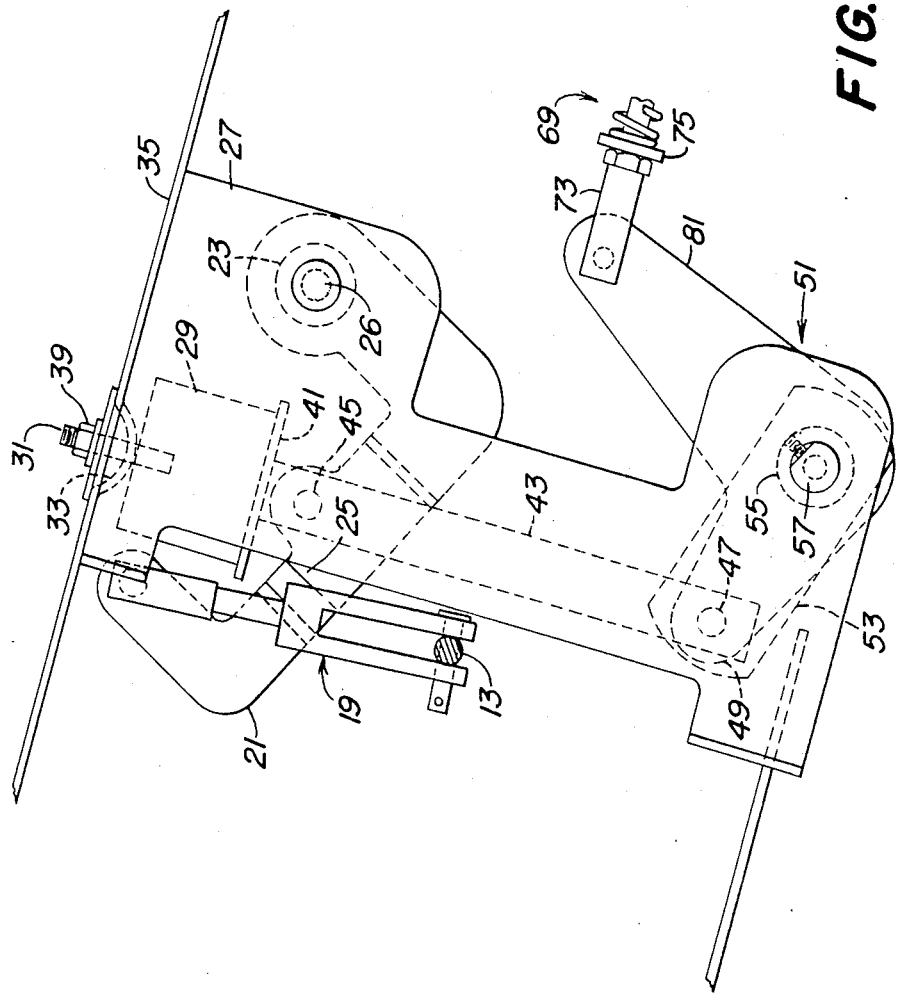
FIG. 2 is a top view of a portion of the PTO brake and clutch actuation assembly.

Referring to FIGS. 1 and 2, a vehicle console, generally indicated as 11, has a power take-off control lever 13 extending into the console through a slot (not shown). A mounting brace 15 of conventional design is fixably mounted by any conventional means to and beneath the console 11 to pivotably maintain the PTO lever 13 at "A" in a conventional manner. The lever 13 further extends beneath the console 11 and is received within a slot (not shown) on a lower support plate 17. The slots in the console 11 and lower support plate 17 serve to confine the travel of control lever 11 to a generally Z-path in a conventional manner. An adjustable travel link 19 is pivotally mounted to the PTO lever 13 at one end by any conventional means such as by a retaining pin and to a first generally U-shaped lever arm 21 at the other end in a conventional manner such as by a ball joint arrangement. A spring 13a is anchored between lever 13 and a sidewall of the tractor and normally biases the lever to one side of the Z-path. The lever arm 21 is in turn fixably mounted by any conventional means to a pivot cylinder 23 pivotably by any conventional means on a shaft 26 extending between support plates 17 and 27 and fixably mounted thereto. A second lever 25 is also fixably mounted by any conventional means to pivot cylinder 23. The support plates 17 and 27 are mounted in the vehicle (not shown) in any of a variety of conventional manners.

An electrically responsive magnetic inductor 29 is fixably mounted on one end of a pin 31 extending through a seat 33 formed in a vehicle support wall 35. A nut 39 is threadably mounted to the other end of pin 31. A magnetically responsive plate 41 is fixably mounted by any conventional means to the end of a link 43. The link 43 is pivotally mounted by any conventional means such as by a pin 45 between the first and second levers 21 and 25 respectively. The other end of link 43 is pivotably mounted by any conventional means such as by a pin 47 between one arm 49 of a bell crank 51 and a link 53. Link 53 and bell crank 51 are keyed to a pivot cylinder 55 pivotably mounted around a shaft 57 fixably mounted by any conventional means between plates 17 and 27. Arm 49 and link 53 thus form first and second arms of the bell crank and motion of PTO level 13 is transferred to the bell crank via a communication means which, in the preferred embodiment includes the travel link 19, lever arm 21 and link 43.

A band brake and electric clutch assembly 59 of conventional design is mounted in a conventional manner around PTO shaft 61 and between opposite arms 63 (only one shown) of a support plate 65 in any conventional manner. The support plate 65 is fixably mounted by any conventional means to a vehicle wall 67. A linkage assembly 69 communicates the arm of bell crank 51 to the band brake and clutch assembly 59. Linkage assembly 69 includes a rod 71. The rod 71 is threadably received in a link 73 having a stop 75. A swivel link 77 is mounted in a seat 79 of link 73 in a conventional manner. The swivel link 77 is also fixably mounted to arm 81 of bell crank 51 in a conventional manner such as with a nut. A portion of rod 71 is slidably received through a slide link 83 which is pivotably mounted at one end by any conventional means to the support plate 63. The other end of rod 71 journeys slidably into and beyond a transverse pin 85 carried by one end of a lever 93. A plurality of threadably mounted nuts 87 and 89 around rod 71 capture the transverse pin 85 therebetween. A spring 91 is placed around the rod 71 and is biased in compression at one end by stop 75 and by the slide link 83 at its other end.

Lever 93 is pivotably mounted to the support plate 65 at "B" by any conventional means. A brake band 95 is secured to a post 97 formed at the other end of lever 93 and the other end of brake band 95 is secured to a post 97 formed in support plate 63, such that the brake band 95 extends around braking surface 99. General linear motion of rod 71 causes the lever 93 to pivot resulting in the tightening or loosening of brake band 95 around the braking surface 99 to correspond to an engaged or disengaged condition. The lever 93 has a landing 101 which is biased against electric switches 103 and 105 when the brake band 95 is in a disengaged position. Switch 105 is hidden behind switch 103 in FIG. 1, but is shown in FIG. 4.

Figure 3:
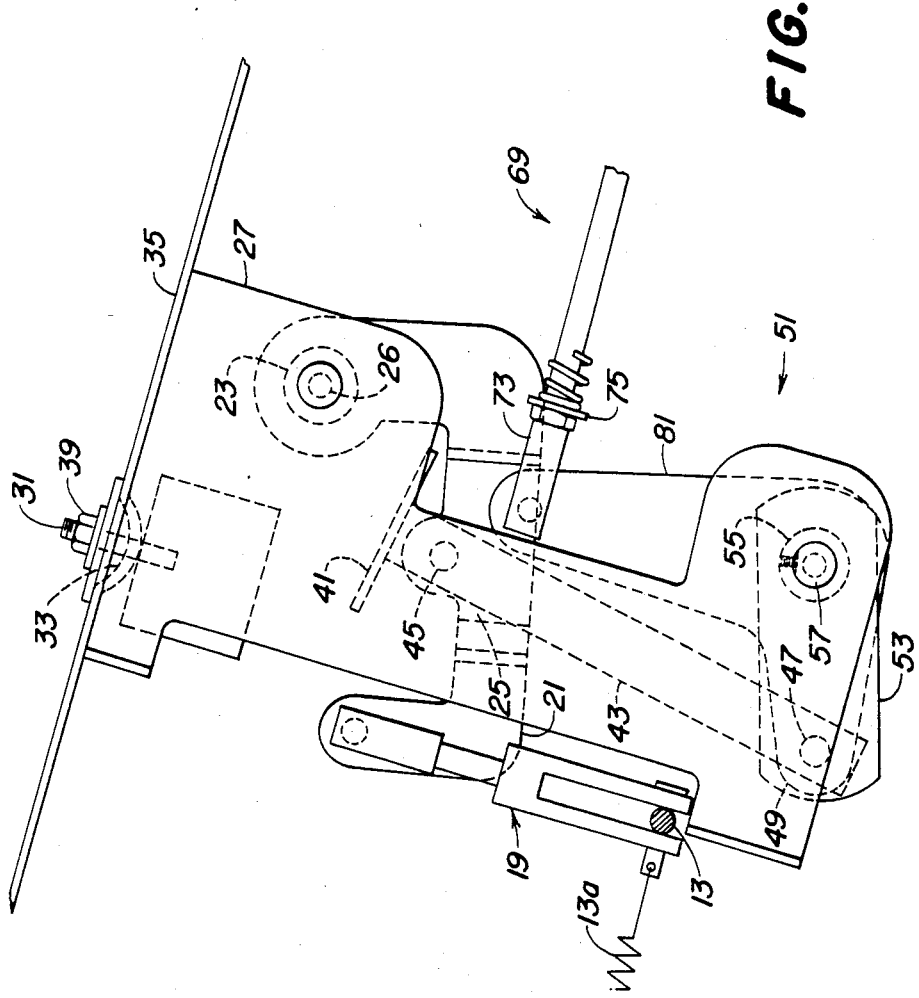
FIG. 3 is a top view of the portion of the PTO brake and clutch actuation assembly in a second position.

Referring now to FIGS. 1 and 3, should the PTO lever 13 be manually displaced so the lower end moves away from the wall 35, the travel link 19 causes the links 21 and 25 to pivot displacing link 43. The displacement of link 43 causes plate 41 to separate from inductor 29. The displacement of link 43 further causes bell crank 51 and link 53 to pivot and draw link 73 and rod 71 to the left, thereby pivoting lever 93 which tightens brake band 95 to assume a brake applied position and places switches 103 and 105 in an "OFF" condition interrupting current flow through a circuit 111 (described subsequently) to disengage electric clutch 107. The bias of spring 91 maintains a brake applied condition. When lever 13 is returned to its original position, lever 93 is pivoted back into contact with switches 103 and 105, placing the switches in an "ON" state. Current can again be directed through circuit 111 to electric clutch 107 for engagement. Brake band 95 is also placed in a slack or released condition. The magnetic force on plate 41 by inductor 29 in this lever 13 position is sufficient to overcome the biasing force of spring 91 allowing the PTO system to remain "ON".

Figure 4:
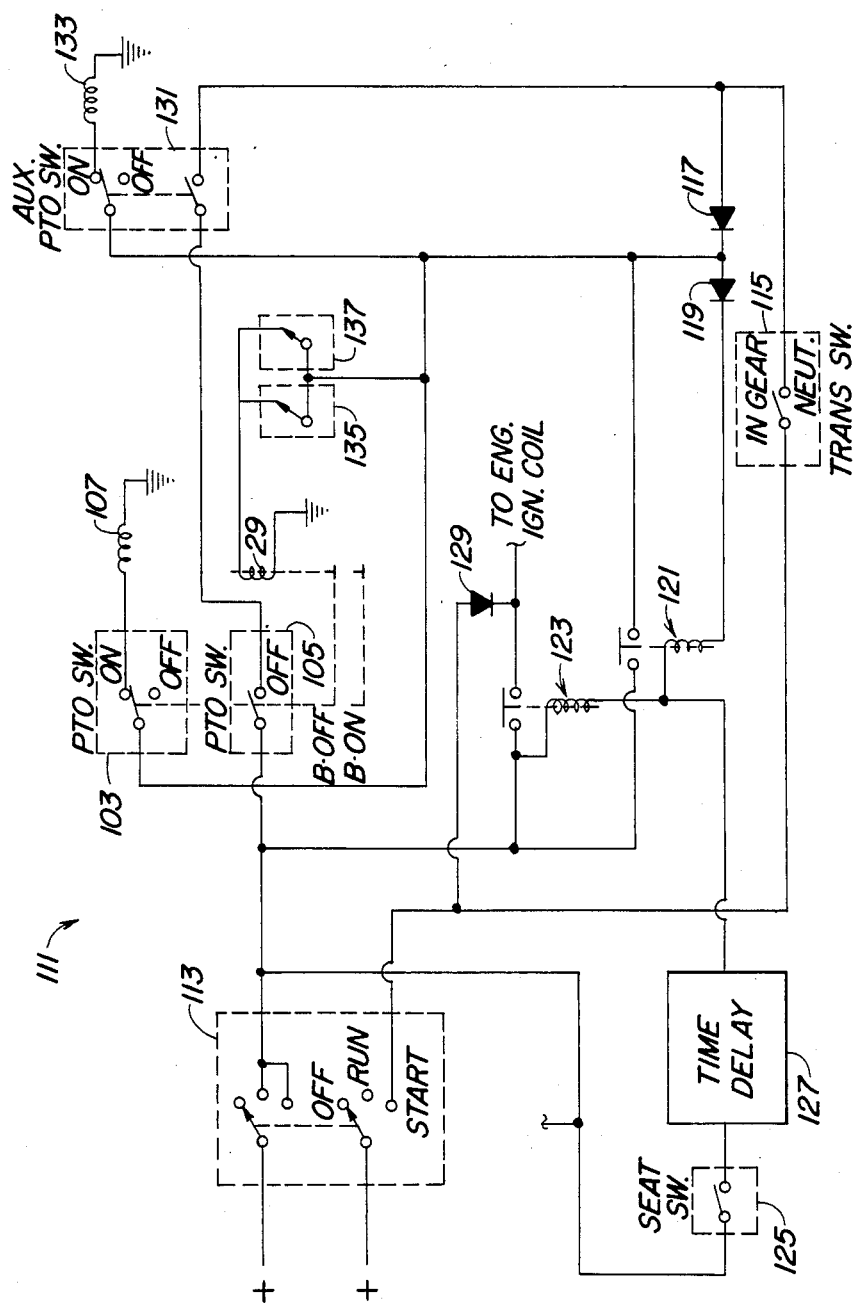
FIG. 4 is a schematic view of an electrical control circuit in accordance with the present invention.

Referring now to FIG. 4, the circuit 111 includes a double switch 113 having an off, run and start position. When the switch 113 is placed in the start position, current is delivered to a transmission switch 115 requiring that the vehicle transmission (not shown) be placed in neutral to allow current to be transmitted therethrough. Current is then delivered from the transmission switch 115 through diodes 117 and 119 to a coil switch 121 and a coil switch 123 closing the coil switches. Current is also delivered to coil switches 121 and 123 through seat switch 125 and time delay 127. Current is further delivered through diode 129 to the vehicle engine ignition coil (not shown) allowing the vehicle to attain a start mode. During the start-up phase, the PTO switches 103 and 105 are set in the "OFF" position by lever 13.

When the switch 113 is placed in the run position, current is delivered through coil switch 123 to the engine coil and is delivered through coil switch 121 to an auxiliary PTO switch 131. The auxiliary PTO switch 131 controls a conventional electric clutch 133. The inclusion of switch 131 and clutch 133 allow the circuit 111 to be employed on those tractors which include a conventional auxiliary PTO system as an option. Power is delivered through two brake switches 135 and 137 communicated in parallel to magnetic inductor 29. The brake switches 135 and 137 are conventionally normally closed contact switches. The switches 135 and 137 are placed in proximity to the vehicle's brake pedals (not shown) in a conventional manner such that a respective switch is open only when the associated brake pedal is fully depressed. As a result, current to the magnetic inductor 29 is only interrupted when both vehicle brake pedals are fully depressed.

It is observed that should the brake band 95 be placed in the engaged position (B-on), PTO switch 103 is placed in an "OFF" position to disrupt current to and thereby disengage PTO clutch 107 (represented in FIG. 4 as inductance 107) and PTO switch 105 is also in the "OFF" position. Further, should the brake band be placed in the disengaged position (B-off), PTO switch 103 is placed in the "ON" position to allow current to and thereby engage PTO clutch 107 and PTO switch 105 is placed in an open position. Should a panic situation arise, the depression of the vehicle brakes to a maximum position will open both switches 135 and 137 disrupting flow to magnetic inductor 29 causing the spring 91 to apply the brake band and close switch 103 to disengage the clutch 107.

We claim:

1. A PTO brake-clutch actuation system for a tractor having a plurality of walls, an operator's station, a PTO shaft, and a PTO brake and current responsive clutch for said PTO shaft, said actuation system being mounted to said plurality of walls, operatively communicating with said PTO brake and current responsive clutch, and being operator actuated from said operator's station, said actuation system comprising:

an actuation lever pivotally mounted at a point along its length to one of said tractor walls such that one end of said actuation lever extends into the operator station;

said PTO brake having a brake band displaceable between first and second positions and fixably mounted at one end to one of said tractor walls;

a brake lever having one end fixably mounted to the other end of said brake band and being pivotally mounted at a joint therealong to said tractor walls;

linkage means for communicating motion of said actuation lever to the other end of said brake lever, said linkage means including biasing means for biasing said lever such that said brake band assumes and maintains said second position;

magnetic means for communicating with said linkage means to overcome said biasing means such that said brake band can assume selectively and maintain said first position in response to electrical current delivered to said magnetic means; and circuit means for directing electrical current to said magnetic means and said current responsive clutch.

2. A PTO brake-clutch actuation system as claimed in claim 1 wherein said linkage means comprises:

a bell crank pivotally mounted to another one of said tractor walls having first and second arms;

a rod having one end swivelly mounted to said second arm of said bell crank;

a slide link pivotally mounted at one end to another one of said tractor walls, having an apertured forward portion oriented generally perpendicular to and slidably receiving said rod;

a stop member fixably mounted to said rod;

a spring placed around said rod and held in compression between said forward portion of said slide link and said stop member:

said other a second end of said rod being fixably mounted to said other end of said brake lever; and communication means for communicating pivotal motion of said actuation lever to said bell crank such that said bell crank will pivot in response thereto.

3. A PTO brake-clutch actuation system as claimed in claim 2 wherein said communication means comprises:

a generally U-shaped lever pivotally mounted at one end to one of said tractor walls;

a travel link pivotally mounted to said actuation lever at one end and said U-shaped lever at the other end; and a link pivotally mounted at one end at a point along said U-shaped lever and pivotally mounted at its other end to said first arm of said bell crank.

4. A PTO brake-clutch actuation system as claimed in claim 1 wherein said magnetic means comprises:

an inductor current means responsive to create a magnetic field fixably mounted to one of said tractor walls;

a generally U-shaped lever pivotally mounted at one end to one of said tractor walls;

a travel link pivotally mounted to said actuation lever at one end and said U-shaped, lever at the other end;

a link pivotally mounted in the proximity of one end to said U-shaped lever and pivotally mounted at its other end to said first arm of said bell crank; and a plate fixably mounted to one end of said link such that pivotal displacement of said U-shaped lever brings said plate into abutting relationship to said inductor current means or places said plate remote to said inductor current means.

5. A PTO brake-clutch actuation system as claimed in claim 1, wherein said circuit means comprises:

a brace fixably mounted to one of said tractor walls;

a first normally on PTO switch fixably mounted to said brace such that said brake lever is biased against said first PTO switch placing said first PTO switch in an "OFF" position when said actuation lever is in a first position;

a current source;

means for delivering current from said current source to said PTO switch;

means for delivering current from said PTO switch to said clutch; and means for delivering current from said current source to said magnetic means.

6. A PTO brake-clutch actuation system as claimed in claim 5, wherein said current delivery means to said magnetic means comprises:

said vehicle having a first and second vehicle brake pedal;

a third normally closed switch;

a fourth normally closed switch;

said third and fourth switches fixably mounted in said vehicle such that they are fully open only when said vehicle brake pedals are fully depressed;

means for communicating said third and fourth switches in parallel; and means for delivering current to said PTO switch from said current source and from said third and fourth switches to said magnetic means.

7. A PTO brake-clutch actuation system for a tractor having a plurality of walls, an operator's station, a PTO shaft, and a PTO brake and current responsive clutch for said PTO shaft, said actuation system being mounted to said plurality of walls, operatively communicating with said PTO brake and current responsive clutch and being operator actuated from said operator's station, said actuation system comprising:

an actuation lever pivotally mounted at a point along its length to one of said tractor walls such that one end of said actuation lever extends into said tractor's operator station;

said PTO brake having a brake band and displaceable between first and second positions and fixably mounted at one end to one of said tractor walls;

a brake lever having the other end of said brake band fixably mounted thereto, said brake lever being pivotably mounted to one of said tractor walls;

linkage means for communicating motion of said actuation lever to said brake lever, said linkage means comprising:

a bell crank having first and second arms pivotally mounted to another one of said tractor walls, said arms having a generally perpendicular orientation;

a rod having one end swivelly mounted to said second arm of said bell crank;

a slide link pivotally mounted at one end to another one of said tractor walls, having a forward portion oriented generally perpendicular to said rod and containing an aperture therein, said rod extending into and beyond said aperture;

a stop member fixably mounted to said rod;

a spring placed around said rod and held in compression between said forward portion of said slide link and said stop member;

a second end of said rod being fixably mounted to said brake lever;

communication means for communicating pivotal motion of said actuation lever to said bell crank such that said bell crank will pivot in response thereto;

magnetic means for communicating with said linkage means to overcome said spring such that said brake band can selectively assume and maintain said first position in response to electrical current delivered to said magnetic means; and circuit means for directing electric current to said magnetic means and said current responsive clutch.

8. A PTO brake-clutch actuation system as claimed in claim 7 wherein said magnetic means comprises:

an inductor current means responsive to create a magnetic field fixably mounted to another one of said tractor walls; and a plate fixably mounted to and movable with said communication means such that pivotal displacement of said lever brings said plate into abutting relationship to said inductor current means or placing said plate remote to said inductor current means.

9. A PTO brake-clutch actuation system as claimed in claim 7 wherein said circuit means comprises:
- a brace fixably mounted to one of said tractor walls;
- a first normally on PTO switch fixably mounted to said brace such that said lever is biased against said first PTO switch placing said PTO switch in an "OFF" position when said actuation lever is in a first position;
- a current source;
- means for delivering current from said current source to said PTO switch;
- means for delivering current from said PTO switch to said clutch; and
- means for delivering current from said current source to said magnetic means.

* * * * *

UNITED STATES PATENT AND TRADEMARK OFFICE
CERTIFICATE OF CORRECTION

PATENT NO. : 4,671,395

DATED : 9 June 1987

INVENTOR(S) : Dale R. Dobberpuhl et al

It is certified that error appears in the above-identified patent and that said Letters Patent is hereby corrected as shown below:

Column 4, line 52, delete "joint" and insert therefor -- point -- ; Column 5, line 11, delete "said other"; Column 6, line 21, delete "and".

Signed and Sealed this

Seventh Day of June, 1988

Attest:

DONALD J. QUIGG

Attesting Officer

Commissioner of Patents and Trademarks